March 24, 1959     I. H. SMITH     2,879,098

HANDLE FOR ATTACHMENT TO METALLIC FOIL DISHES

Filed July 16, 1956

INVENTOR.
Irving H. Smith.
BY
D. Emmett Thompson
ATTORNEY.

United States Patent Office 2,879,098
Patented Mar. 24, 1959

2,879,098

HANDLE FOR ATTACHMENT TO METALLIC FOIL DISHES

Irving H. Smith, Norwich, N.Y.

Application July 16, 1956, Serial No. 597,992

3 Claims. (Cl. 294—27)

This invention relates to handles for attachment to dishes. At the present time, a number of food items are prepared and sold in frozen condition. Certain of these items, such as pies for example, are packaged in dishes formed of metal foil, and have at their upper edges radially extending brim flanges. The food product is heated in an oven before serving. These single service metallic foil dishes serve for this purpose and after removal of the food product, the dish is thrown away.

Due to the fact that these dishes are formed of metal foil, they are heated to a temperature whereby they cannot be handled with the bare hands, making it extremely difficult to remove the contents from the dish. This invention has more particularly as an object a handle embodying a structural arrangement which is very economical to manufacture and which may be quickly and conveniently attached to the heated dish and provides a means for conveniently handling the dish. The arrangement is such that these handles can be manufactured at such a low cost that they can be packaged with each food item and disposed of together with the used dish.

The invention consists in the novel features and in the combinations and constructions hereinafter set forth and claimed.

In describing this invention, reference is had to the accompanying drawings in which like characters designate corresponding parts in all the views.

Figure 2:
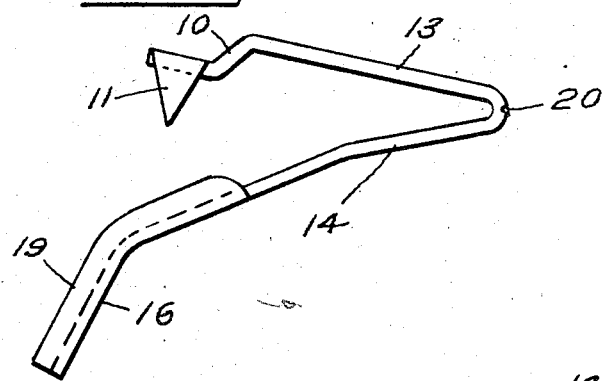
Figure 2 is a side elevational view of the handle member prior to its attachment to the dish.
Figure 3:
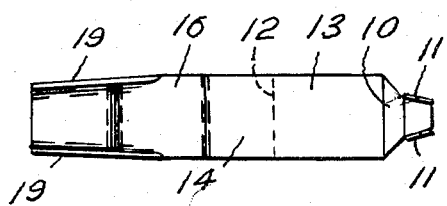
Figure 3 is a bottom plan view of the formed handle prior to being folded upon itself.
Figure 4:
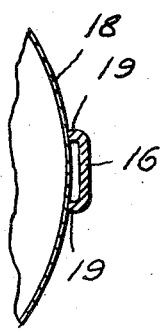
Figure 4 is a sectional view taken on line 4—4 of Figure 1.

The handle is formed from a strip of pliable sheet material, such as aluminum. One end of this strip is formed with a slightly offset portion 10 and with a depending part for engagement with the brim flange of the dish. Preferably, this end portion 10 is formed with a pair of barbs 11, these barbs being preferably located within the width of the strip to avoid waste of material. The strip is bent upon itself, as indicated by the line 12, Figure 3, to form an upper portion 13, and a lower portion 14. These upper and lower portions diverge, as shown in Figure 2, to permit the reception of the brim flange 15 of the dish between the barbs 11 and the lower portion 14. These portions 13, 14, are in the form of finger grasping portions.

Figure 1:
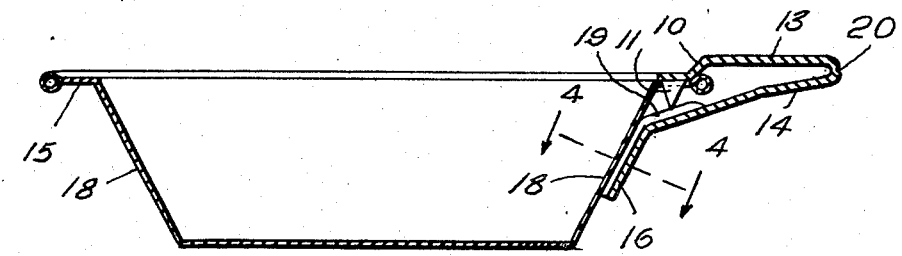
Figure 1 is a sectional view of a dish with the handle attached thereto.

The lower end section 16 of the lower portion 14 is bent downwardly on an angle substantially comparable to the side wall 18 of the dish for engagement therewith, as shown in Figure 1. This end portion 16 is of channel formation confronting the side wall 18 of the dish and having side flanges 19 engaging the side wall whereby the portion 16 is spaced outwardly from the side wall of the dish thereby effectively reducing the heat transfer from the hot dish to the handle. The handle is applied to the dish by positioning the upper and lower finger grasping portions 13, 14, over the brim flange 15 and squeezing the upper and lower portions together. This action causes the barbs 11 to pierce the brim flange 15 and this simple operation fixedly secures the handle to the dish with the flanges 19 engaging the side wall of the dish below the flange, whereby the dish and its contents may be conveniently handled.

The strip, from which the handle is formed, may be weakened or notched, as at 20 in Figure 2. This weakening of the strip does not in any way affect the utility and efficiency of the handle attached to the dish, but it prevents re-use of the handle due to the fact that if the upper and lower portions 13, 14, are again spread apart and recompressed for attachment to another dish, the strip will break at the fold line. The purpose of this arrangement is to provide an effective and practical handle which may be furnished with these packaged food items by a food processor but will prevent re-use of the handle on such dishes placed on the market by a competitive firm.

It will be apparent that the handle is most economically formed by a simple blanking and folding operation which can be carried out by relatively simple die structure employed on a conventional punch press.

What I claim is:

1. A disposable handle for attachment to disposable dishes formed of thin sheet ductile material and having a radial brim flange, said handle comprising a strip of pliable sheet material folded upon itself intermediate its ends to form upper and lower finger grasping portions diverging from said fold for reception of the brim flange of the dish therebetween, the free end of said lower portion extending downwardly at an angle complemental to the side of said dish for engagement with the side of the dish below said brim flange, the free end of said upper portion being formed with an offset portion having at least one barb disposed within the width of said upper portion and extending downwardly from said offset portion for piercing the brim flange of the dish when said upper and lower portions are squeezed together, said lower portion extending beyond said barb toward said dish.

2. A handle structure as set forth in claim 1, wherein said strip is weakened at said fold.

3. A handle for attachment to a circular dish formed of metal foil and having a radial brim flange, said handle comprising a strip of pliable material folded upon itself to form upper and lower finger grasping portions diverging from said fold to provide for the reception of the brim flange between the free end of said upper portion and said lower portion, the free end section of said lower portion extending downwardly and being of channel formation having spaced apart flanges for engagement with the side of the dish below said brim flange, said upper portion being formed with a pair of barbs disposed in side by side relation and extending downwardly for piercing the brim flange when said upper and lower portions are squeezed together, and said strip being weakened at said fold.

References Cited in the file of this patent

UNITED STATES PATENTS

| | | |
|---|---|---|
| 1,998,771 | Smith | Apr. 23, 1935 |
| 2,073,475 | Gordon | Mar. 9, 1937 |
| 2,116,928 | Hanneman | May 10, 1938 |

FOREIGN PATENTS

| | | |
|---|---|---|
| 786,153 | France | June 3, 1935 |